(12) United States Patent
Lai et al.

(10) Patent No.: US 10,194,725 B2
(45) Date of Patent: Feb. 5, 2019

(54) WATERPROOF CASE

(71) Applicant: CATALYST LIFESTYLE LIMITED, North Point (HK)

(72) Inventors: June Lai, Hong Kong (CN); Joshua Wright, Hong Kong (CN)

(73) Assignee: CATALYST LIFESTYLE LIMITED, North Point, Hong Kong (CN)

( * ) Notice: Subject to any disclaimer, the term of this patent is extended or adjusted under 35 U.S.C. 154(b) by 294 days.

(21) Appl. No.: 14/591,552

(22) Filed: Jan. 7, 2015

(65) Prior Publication Data

US 2015/0189963 A1 Jul. 9, 2015

Related U.S. Application Data

(60) Provisional application No. 61/924,494, filed on Jan. 7, 2014.

(51) Int. Cl.
G06F 1/16 (2006.01)
A45C 13/00 (2006.01)
A45C 11/00 (2006.01)
H04B 1/3888 (2015.01)

(52) U.S. Cl.
CPC ............ *A45C 13/008* (2013.01); *A45C 11/00* (2013.01); *H04B 1/3888* (2013.01); *A45C 2011/002* (2013.01)

(58) Field of Classification Search
USPC ........................................ 206/320; 200/302.2
See application file for complete search history.

(56) References Cited

U.S. PATENT DOCUMENTS 3,746,206 A 7/1973 Utz
5,211,471 A * 5/1993 Rohrs ................. F21V 23/0414
200/302.2
6,068,119 A 5/2000 Derr et al.
6,349,824 B1 2/2002 Yamada
(Continued)

FOREIGN PATENT DOCUMENTS

CN 201042019 Y 3/2008
CN 201639626 U 11/2010
(Continued)

OTHER PUBLICATIONS

International Search Report and Written Opinion for PCT/US15/10505 dated Apr. 29, 2015.
(Continued)

*Primary Examiner* — Jacob K Ackun
(74) *Attorney, Agent, or Firm* — Dinsmore & Shohl LLP

(57) ABSTRACT

A protective case for an electronic device includes a main housing including a case member. The case member includes a plurality of female stabilization structures formed therein. A lid including male stabilization features formed thereon are received in the female attachment structures. The main housing and lid are removably joined to define an air and water tight volume receiving an electronic device. The main housing member includes an inner wall and the lid includes a groove formed therein receiving a gasket wherein the gasket is compressed between the main housing and the lid to provide a water and air tight seal and wherein the compression of the gasket is countered by the male and female stabilization features.

3 Claims, 17 Drawing Sheets

(56) References Cited

U.S. PATENT DOCUMENTS

| | | |
|---|---|---|
| 6,568,619 B1 | 5/2003 | Shiga et al. |
| 6,646,864 B2 | 11/2003 | Richardson |
| 6,995,976 B2 | 2/2006 | Richardson |
| 7,180,735 B2 | 2/2007 | Thomas et al. |
| 7,230,823 B2 | 6/2007 | Richardson et al. |
| 7,312,984 B2 | 12/2007 | Richardson et al. |
| 7,449,650 B2 | 11/2008 | Richardson et al. |
| 7,609,512 B2 | 10/2009 | Richardson et al. |
| 7,663,879 B2 | 2/2010 | Richardson et al. |
| 7,688,580 B2 | 3/2010 | Richardson et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,045,323 B2 | 10/2011 | Murakata |
| D670,280 S | 11/2012 | Rayner |
| 2004/0178202 A1 | 9/2004 | Serio |
| 2005/0067216 A1 | 3/2005 | Schuhmann et al. |
| 2006/0279924 A1 | 12/2006 | Richardson et al. |
| 2007/0087640 A1 | 4/2007 | Albertone et al. |
| 2007/0115387 A1 | 5/2007 | Ho |
| 2007/0139873 A1 | 6/2007 | Thomas et al. |
| 2007/0297149 A1 | 12/2007 | Richardson et al. |
| 2008/0094786 A1* | 4/2008 | Liou ................ G02F 1/133308 361/679.21 |
| 2009/0194400 A1* | 8/2009 | Mackay ................ H01H 13/06 200/302.2 |
| 2009/0236207 A1* | 9/2009 | Shi ................ H01H 13/06 200/302.2 |
| 2010/0008028 A1 | 1/2010 | Richardson et al. |
| 2010/0104814 A1 | 4/2010 | Richardson et al. |
| 2010/0147737 A1 | 6/2010 | Richardson et al. |
| 2010/0200456 A1 | 8/2010 | Parkinson |
| 2011/0003213 A1 | 1/2011 | Burchardt et al. |
| 2011/0024315 A1* | 2/2011 | Kim ................ H04M 1/18 206/320 |
| 2011/0073608 A1 | 3/2011 | Richardson et al. |
| 2011/0139643 A1 | 6/2011 | Elenes |
| 2011/0226545 A1 | 9/2011 | Richardson et al. |
| 2011/0228458 A1 | 9/2011 | Richardson et al. |
| 2011/0228459 A1 | 9/2011 | Richardson et al. |
| 2012/0018323 A1* | 1/2012 | Johnson ................ H04B 1/3888 206/320 |
| 2012/0031914 A1 | 2/2012 | Liu |
| 2012/0043235 A1* | 2/2012 | Klement ................ A45C 11/00 206/320 |
| 2012/0074005 A1 | 3/2012 | Johnson et al. |
| 2012/0118773 A1* | 5/2012 | Rayner ................ G06F 1/1626 206/320 |
| 2012/0211382 A1 | 8/2012 | Rayner |
| 2012/0227251 A1 | 9/2012 | Hyuga et al. |
| 2012/0261306 A1 | 10/2012 | Richardson et al. |
| 2012/0325723 A1 | 12/2012 | Carnevali |
| 2013/0146491 A1* | 6/2013 | Ghali ................ G06F 1/1626 206/320 |
| 2013/0242481 A1 | 9/2013 | Kim et al. |
| 2013/0255198 A1 | 10/2013 | Guschke et al. |
| 2013/0271902 A1 | 10/2013 | Lai et al. |
| 2014/0262712 A1* | 9/2014 | Chu ................ H01H 13/06 200/302.2 |

FOREIGN PATENT DOCUMENTS

| | | |
|---|---|---|
| CN | 201700109U U | 1/2011 |
| EP | 3092878 A1 | 11/2016 |
| JP | 8046371 A | 2/1996 |
| JP | 9023072 | 1/1997 |
| JP | 3044740 U | 1/1998 |
| JP | 10079582 A | 3/1998 |
| JP | 11231970 A | 8/1999 |
| JP | 11231973 A | 8/1999 |
| JP | 11284358 A | 10/1999 |
| JP | 2000125916 A | 5/2000 |
| JP | 2003324796 A | 11/2003 |
| WO | 2012002899 A1 | 1/2012 |

OTHER PUBLICATIONS

International Search Report, International Application No. PCT/IB2012/002187, 6 pages.
International Search Report and Written Opinion for PCT/US2014/010524, dated Jul. 3, 2014.
Int'l Search Report for EP15735322.8, dated Jul. 13, 2017.
"[Review] The Newest Waterproof Case on the Market: Introducing the Escape Capsule . . . , iPhoneLife.com", iPhone + iPad Life Magazine, Nov. 6, 2012, XP055292666, Retrieved from the Internet: URL:http://www.iphonelife.com/blog/28861/review-newest-waterproof-case-market-introducing-escape-capsule [retrieved on Aug. 2, 2016].

* cited by examiner

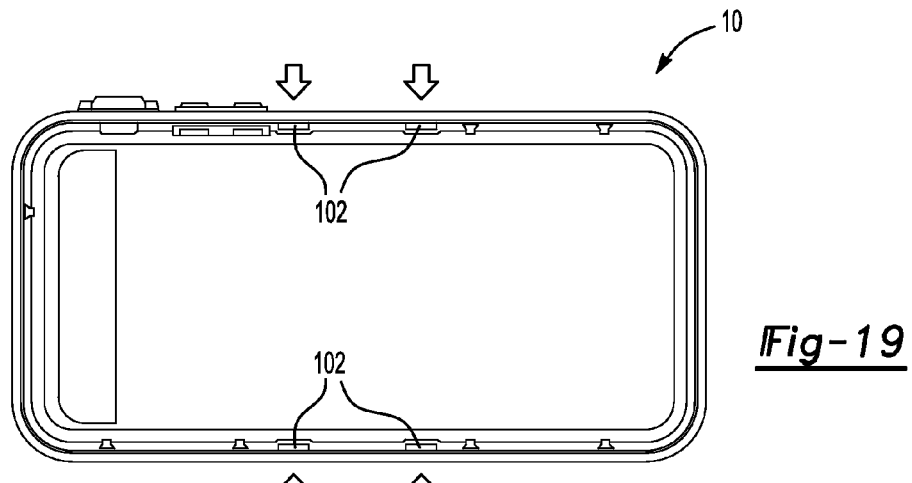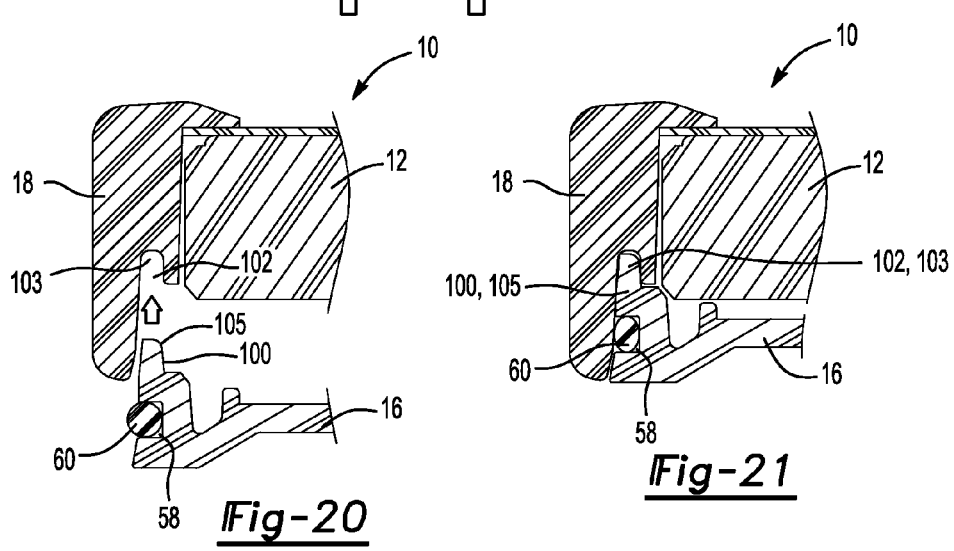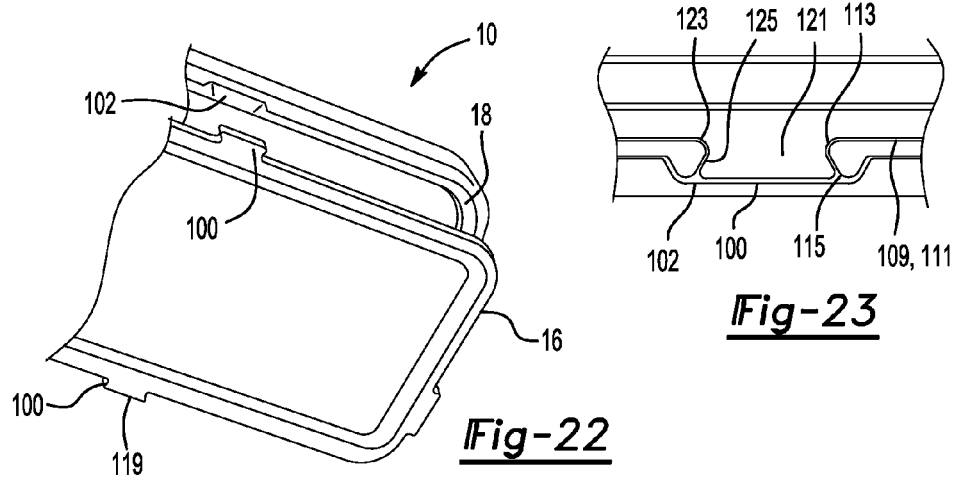

WATERPROOF CASE

CROSS REFERENCE TO RELATED APPLICATIONS

This application claims priority to provisional application No. 61/924,494 filed on Jan. 7, 2014 and is herein incorporated by reference in its entirety.

FIELD OF THE INVENTION

The invention relates to water and air sealed cases for electronic devices.

BACKGROUND OF THE INVENTION

Waterproof housings for various devices are known in the art. However such water proof housings are not specifically designed for the actuation of toggles or screens of the enclosed electronic device and to provide a clear transmission of sound from the interior of the case to an exterior of the case and/or from the exterior to the interior of the case. There is therefore a need in the art for an air and water tight case that has an improved sound transmission and allows a user to actuate various portion of the device while positioned within the case.

There is described herein a waterproof case with access to all of an enclosed device's buttons and ports in a way that is much less expensive than current waterproof products on the market. One of the challenges in a fully-functional waterproof case is to have all of the features function including buttons of the device that you can actuate through the waterproof housing. The water proof actuation of the buttons is accomplished without the use of rubber over-molded elements which adds to cost and complexity. The challenge in removing the over-molded rubber is that all waterproof products currently use the rubber over-mold to create integrated rubber buttons into the housing of the case which are sealed waterproof and also flexible to actuate the device's button within.

The case of the present invention includes actuation buttons that are mechanically assembled to the case. These rubber buttons are assembled onto the case and allow access to the toggles or switches on the device within the case. The improvements of the present case reduce the tooling cost as well as the unit cost of the final product. Aside from the reduced cost, another attribute that is important and desirous in the market is to produce a housing that is protective and functional yet not bulky at the same time. It is obvious to those skilled in the art of making cases that to afford protection of the device; this normally would involve enveloping a device in layers of protective material with increasing protection with thicker layers. However, the very important improvements of the present case is to create the ability to produce a case that is protective and function while at the same time reducing the overall volume of the housing so that it is not bulky and yet still is protective at the same time through the use of strategic placement of materials that serves one of the same purposes of the rubber over mold to protect the device from impacts.

SUMMARY OF THE INVENTION

In one aspect, there is disclosed a protective case for an electronic device that includes a main housing including a case member. The case member includes a plurality of female stabilization structures formed therein. A lid including male stabilization features formed thereon are received in the female attachment structures. The main housing and lid are removably joined to define an air and water tight volume receiving an electronic device. The main housing member includes an inner wall and the lid includes a groove formed therein receiving a gasket wherein the gasket is compressed between the main housing and the lid to provide a water and air tight seal and wherein the compression of the gasket is countered by the male and female stabilization features.

In another aspect, there is disclosed a protective case for an electronic device that includes a main housing having a case member. The case member includes slots and ports formed therein allowing interaction with a device positioned within the case member. A separate bumper includes attachment features that are coupled to corresponding attachment features formed on the case member. The main housing and lid are removably joined to define an air and water tight volume receiving an electronic device. Air trapped within the protective case transfers acoustic energy to at least one membrane wherein the membrane vibrates in response to an air pressure differential transmitting sound to an exterior or interior of the case.

In a further aspect, there is disclosed a protective case for an electronic device that includes a main housing having a case member. The case member includes slots and ports formed therein allowing interaction with a device positioned within the case member. Separate button features are assembled to the case member sealing the case member and providing actuation of the device. The main housing and lid are removably joined to define an air and water tight volume receiving an electronic device. Air trapped within the protective case transfers acoustic energy to at least one membrane wherein the membrane vibrates in response to an air pressure differential transmitting sound to an exterior or interior of the case.

BRIEF DESCRIPTION OF THE DRAWINGS

FIG. 19 is a top view of the protective case of FIG. 1 detailing attachment features for connecting the case member and lid;

FIG. 20 is a sectional view of the protective case of FIG. 1 detailing attachment features for connecting the case member and lid;

FIG. 21 is a sectional view of the protective case of FIG. 1 detailing attachment features for connecting the case member and lid;

FIG. 22 is a perspective view of the protective case of FIG. 1 detailing alternative attachment features for connecting the case member and lid;

FIG. 23 is a sectional view of the protective case of FIG. 22 detailing alternative attachment features for connecting the case member and lid;

DETAILED DESCRIPTION OF THE PREFERRED EMBODIMENTS

Figure 1:
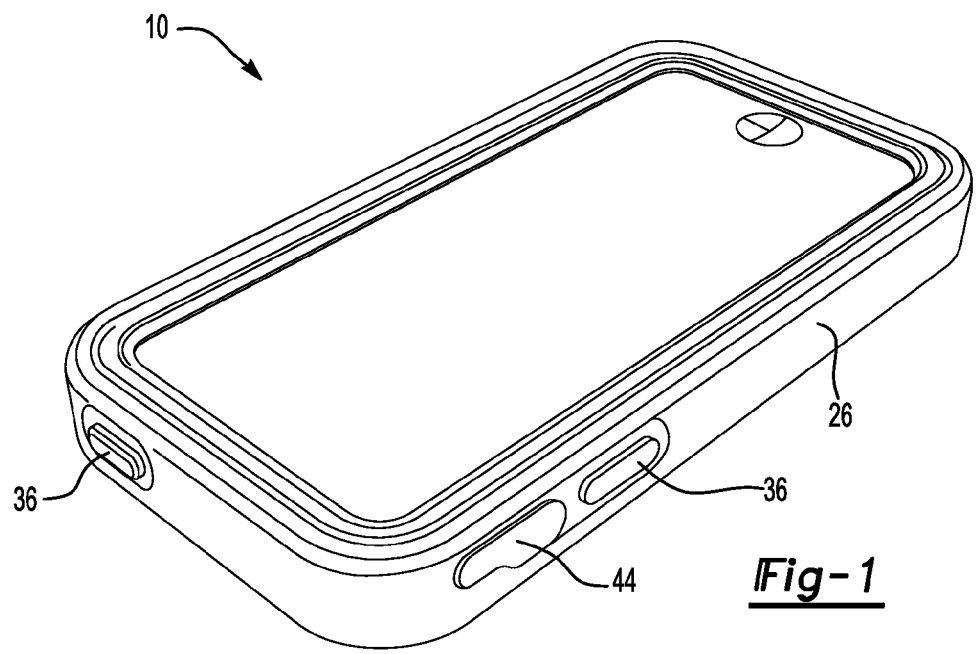
FIG. 1 is an assembled perspective view of one embodiment of a protective case.
Figure 2:
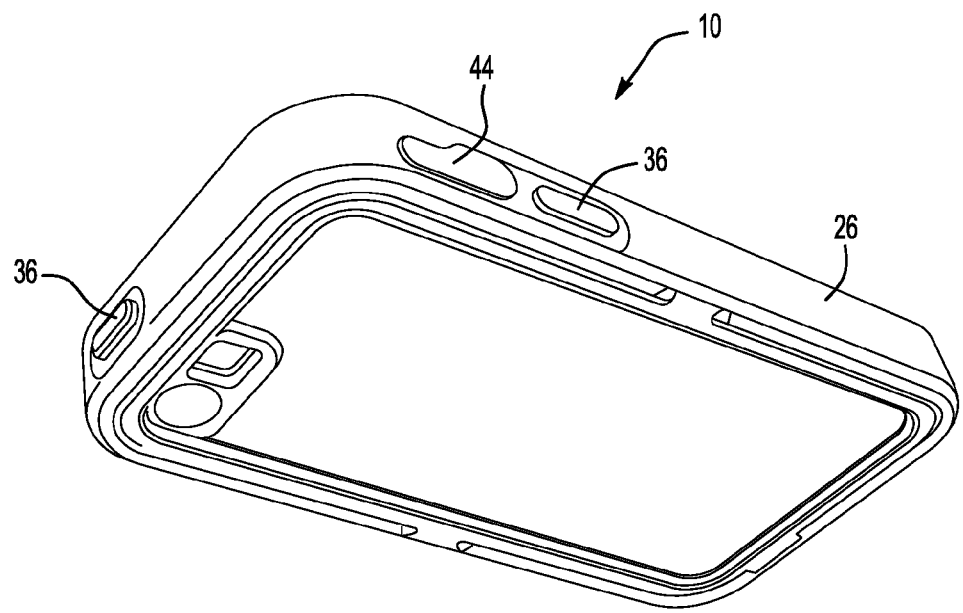
FIG. 2 is an assembled perspective view of one embodiment of a protective case showing another side of FIG. 1.
Figure 3:
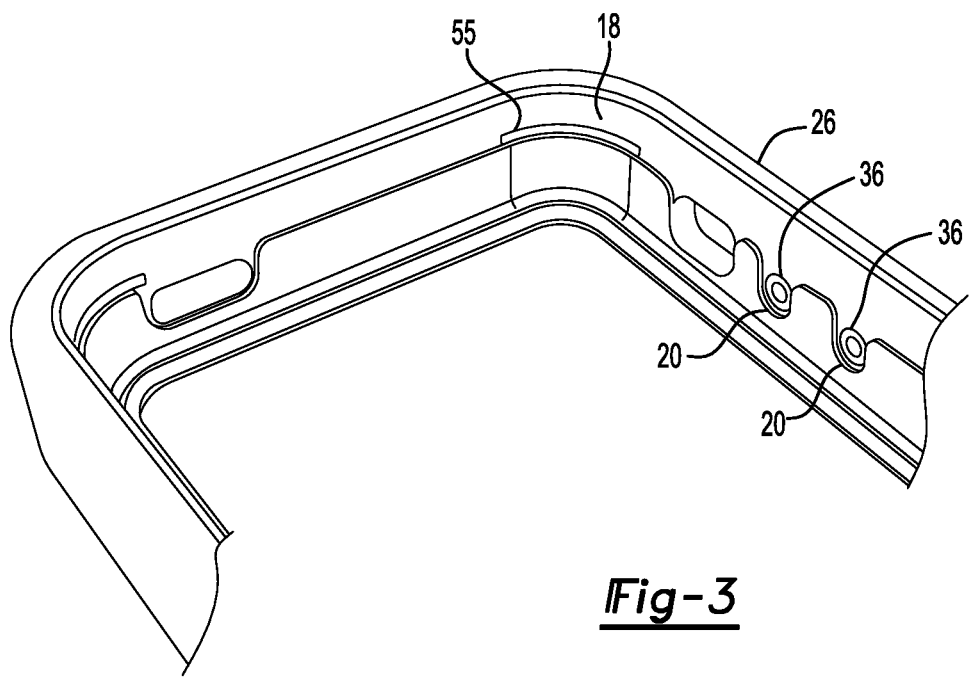
FIG. 3 is a partial perspective view of a protective case including a mechanically attached bumper and separate buttons mechanically assembled to the case member for the embodiment of FIG. 1.
Figure 4:
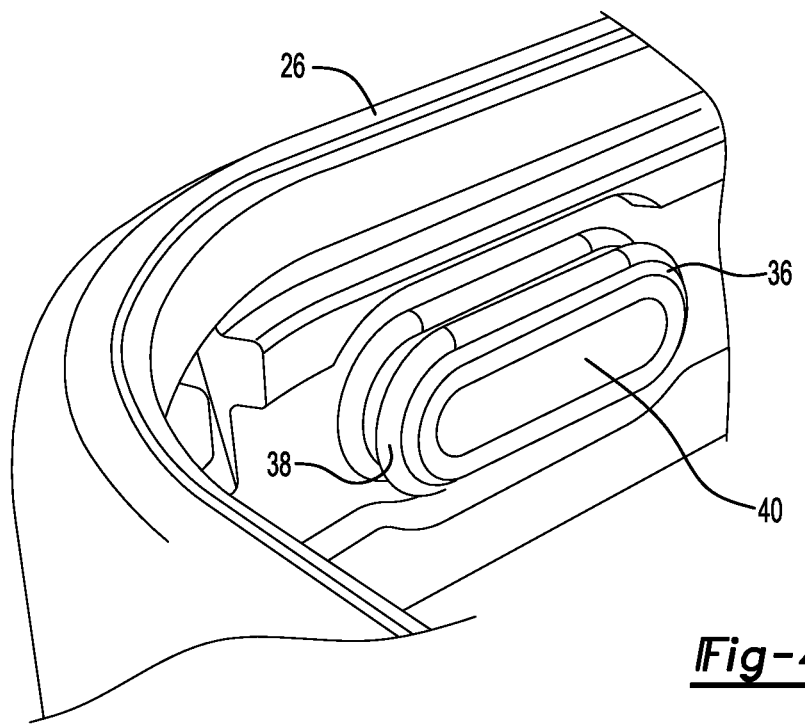
FIG. 4 is a partial sectional view of a bumper and separate buttons for the embodiment of FIG. 1.
Figure 5:
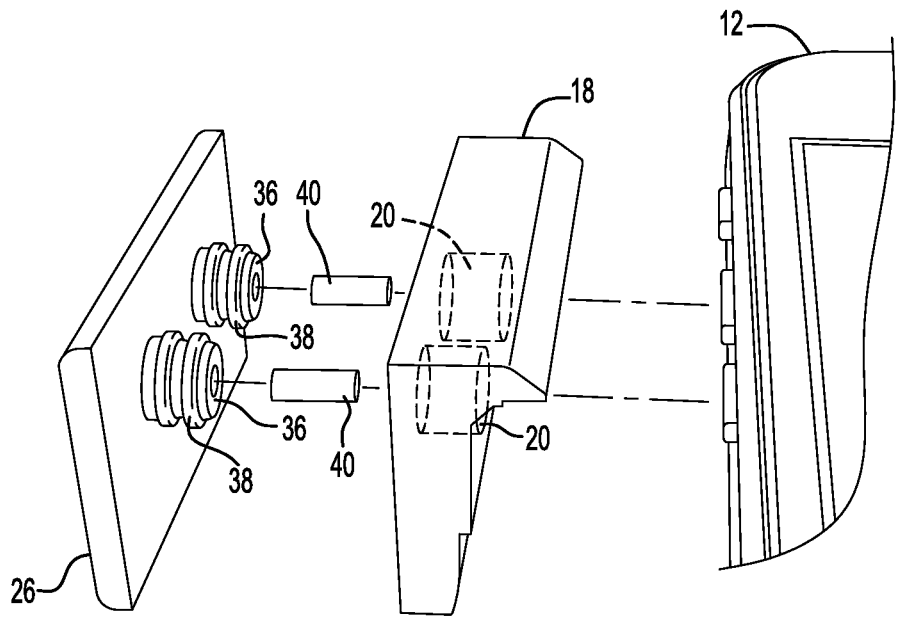
FIG. 5 is a partial exploded perspective view including a mechanically attached bumper and separate buttons mechanically assembled to the case member for the embodiment of FIG. 1.

Referring to the various figures there are shown various embodiments of a water proof case 10 that may include water and air tight acoustic membranes 13. In particular, for membranes that are not permeable to air or water, it is desirable to utilize the pent up air pressure in the air chamber or case to force the membrane to vibrate so that it acts as an air piston. A compliantly mounted membrane allows it to vibrate, instead of clamping it tight which inhibits movement. A compliantly mounted membrane includes a spring-like effect that allows the membrane to vibrate and act as an air piston responding to changes in air pressure to move the membrane allowing sound to transfer and increases an overall sound level. If some instances, sound from a sound source such may be redirected within an air and watertight housing so that a sufficiently large sized membrane and sufficiently large sized air cavity is available to vibrate to act as an air piston. An air and water tight housing that employs air chambers and a non-permeable membrane to create an air piston permits sound from a source inside the housing to propagate through an external aqueous environment without significant attenuation because the acoustic energy within the housing is converted to vibrational energy of the membrane so that sound waves may be generated on the external side of the air and water tight acoustic membrane in water.

For the purposes of creating a waterproof housing to protect the contents of the housing, it is desirable to have a housing made with thick solid walls made of a structurally strong water proof material that can withstand the external environment that it is exposed to and as few openings as possible. However for the functions of some electronic devices to work, there exists a need to have sections that allow the actuation of the device or to somehow allow input and output to be captured. For example, specific functional features of enclosed devices may require sensory response or input such as to proximal visual, reflective, conductive, magnetic, electromagnetic, vibratory, pressure, inductive, piezoelectric, or acoustic elements in the external environment in order for features to operate or buttons or switches to actuate functions. The enclosed devices may have other features that capture input or generate output, such as to capture images, acoustic environment, signals, or to generate light, sound, vibrations, signals or may contain elements to shield from interference signals such as electro-magnetic or radio frequency that may affect other functions on the device. In some of the features described, a consistent thick wall for a waterproof housing will not allow the device to serve this functional purpose within the housing. Hence, some sections may require specific elements to allow the enclosed device to function and operate in a waterproof environment.

Referring to FIGS. 1-8 there is shown a first embodiment of a protective case 10 for an electronic device 12. In one aspect the protective case 10 includes a main housing 14 and a lid 16. The main housing 14 may include a case member 18. The case member 18 may be formed of various materials to provide a rigid structure for the protective case 10. In one aspect, the case member 18 may or may not be formed of a clear material such as a clear plastic resin or other materials that are not clear such as other plastic resins or metal. Various plastic resins including polycarbonate may be utilized or other materials such as polycarbonate blends, acrylics, Tritan copolyester, PES, etc.

Figure 24:
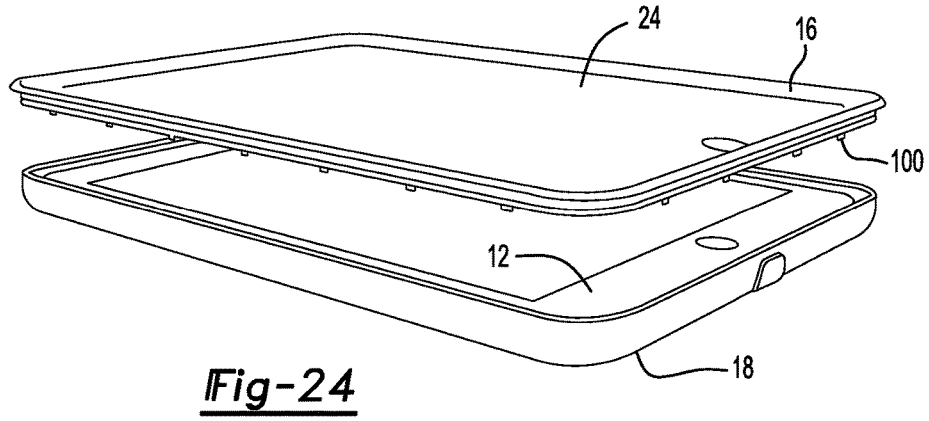
FIG. 24 is a perspective view of an alternative embodiment where the touch screen is incorporated into the lid and including attachment features.
Figure 25:
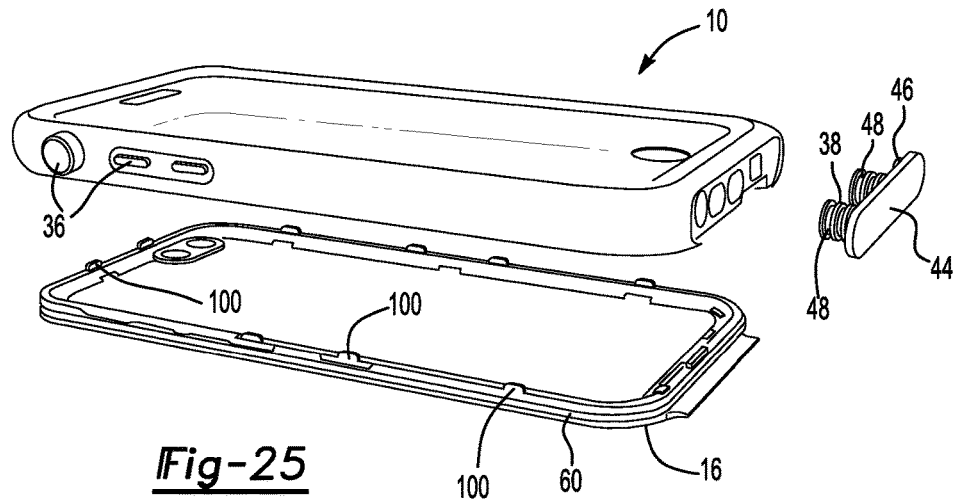
FIG. 25 is an assembled perspective view of an alternative embodiment of a protective case.
Figure 26:
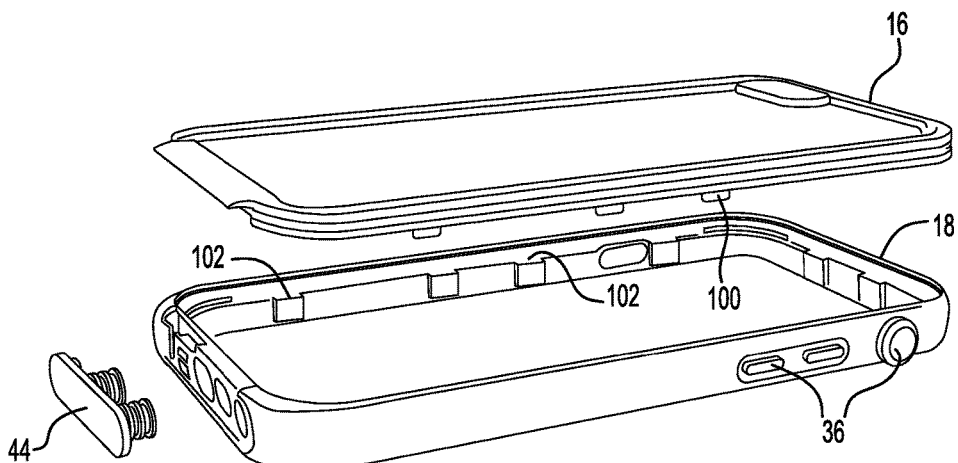
FIG. 26 is an assembled perspective view of an alternative embodiment of a protective case.
Figure 27:
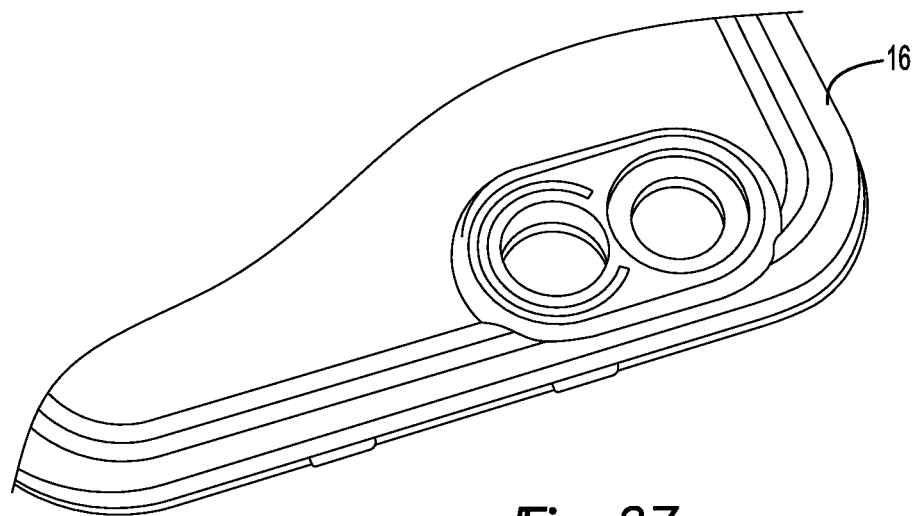
FIG. 27 is a partial perspective view of a lid of the embodiment of FIG. 25.
Figure 28:
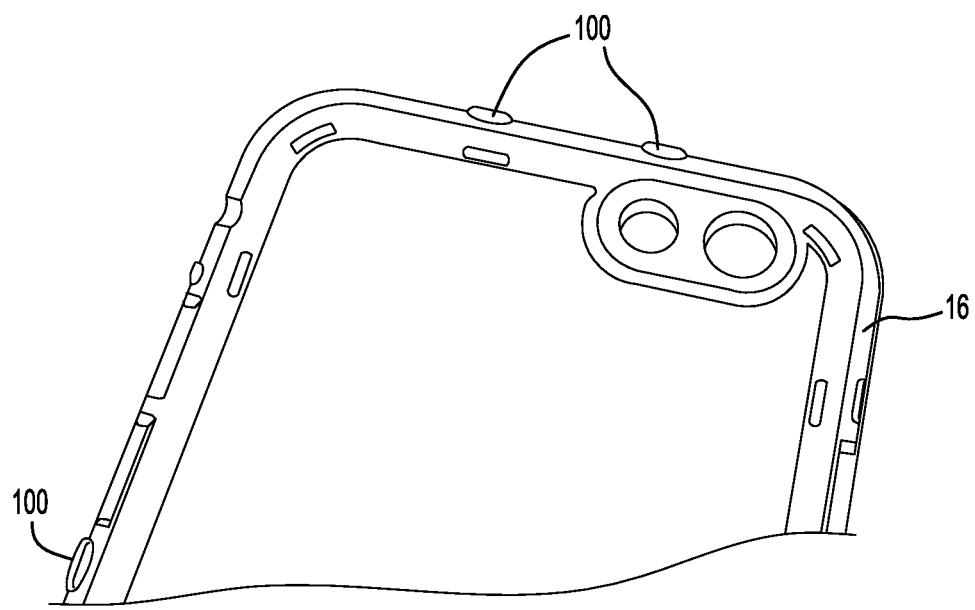
FIG. 28 is a partial perspective view of a lid of the embodiment of FIG. 25.
Figure 29:
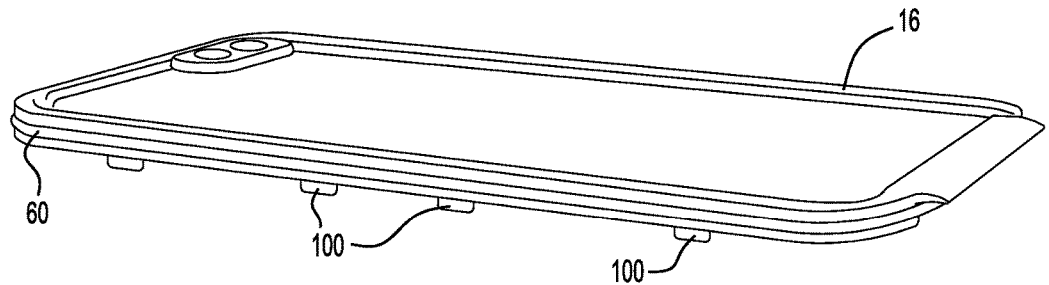
FIG. 29 is a perspective view of a lid of the embodiment of FIG. 25.
Figure 30:
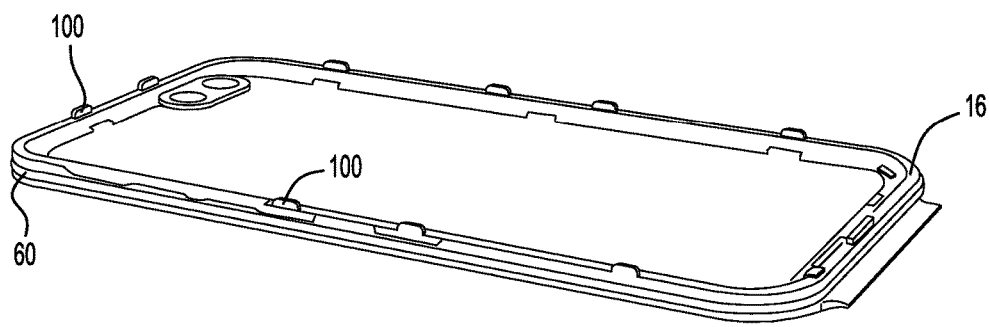
FIG. 30 is a perspective view of a lid of the embodiment of FIG. 25.
Figure 31:
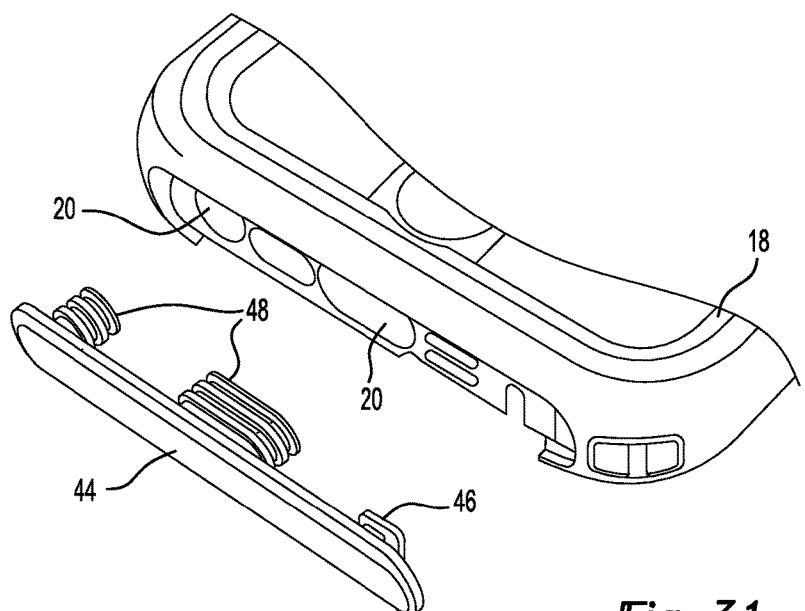
FIG. 31 is a partial perspective view of the plug and case of FIG. 25.
Figure 32:
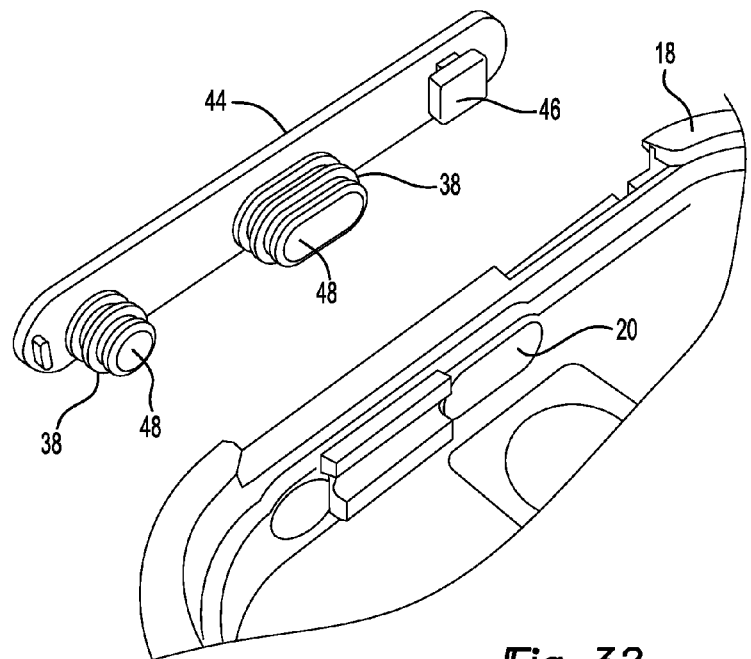
FIG. 32 is a partial perspective view of the plug and case of FIG. 25.
Figure 33:
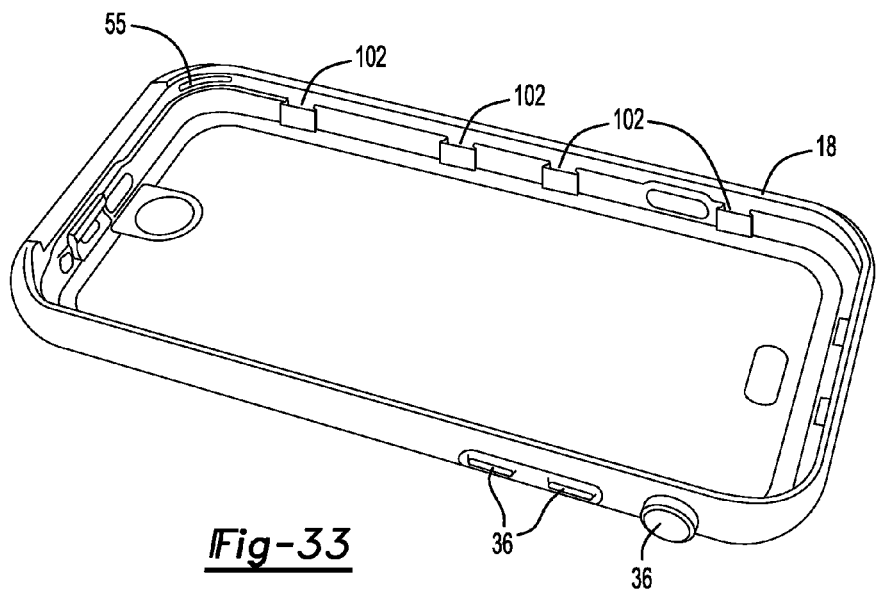
FIG. 33 is a perspective view of a case of the embodiment of FIG. 25.
Figure 34:
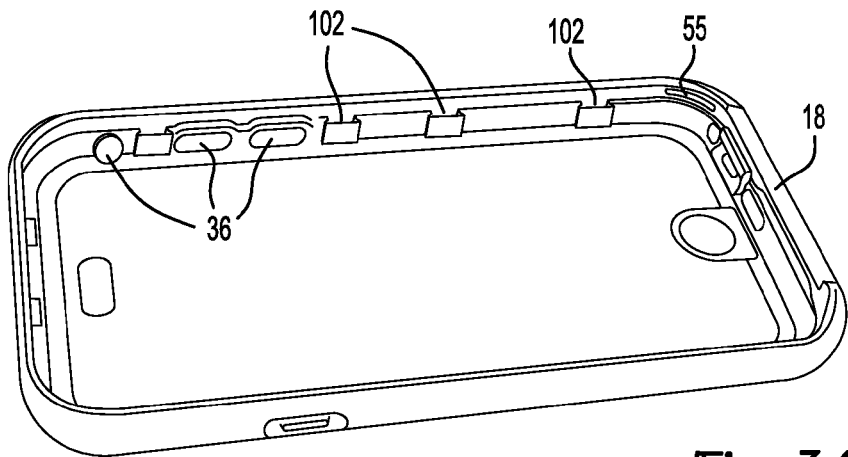
FIG. 34 is a perspective view of a case of the embodiment of FIG. 25.
Figure 35:
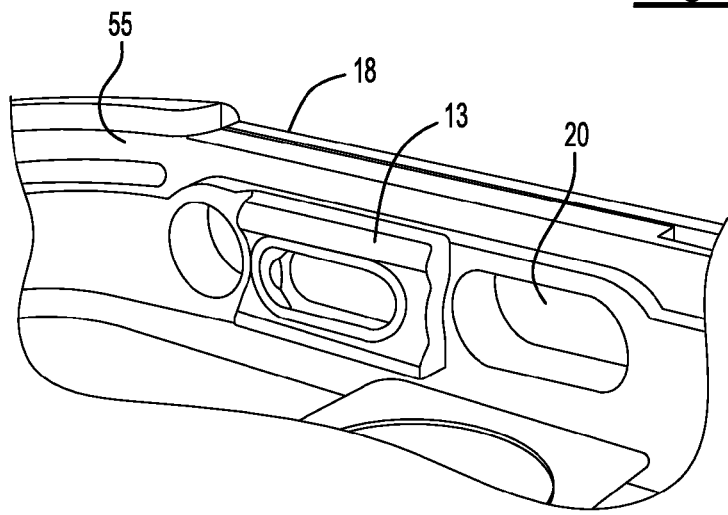
FIG. 35 is a partial perspective view of the plug and a membrane of the embodiment of FIG. 25.
Figure 36:
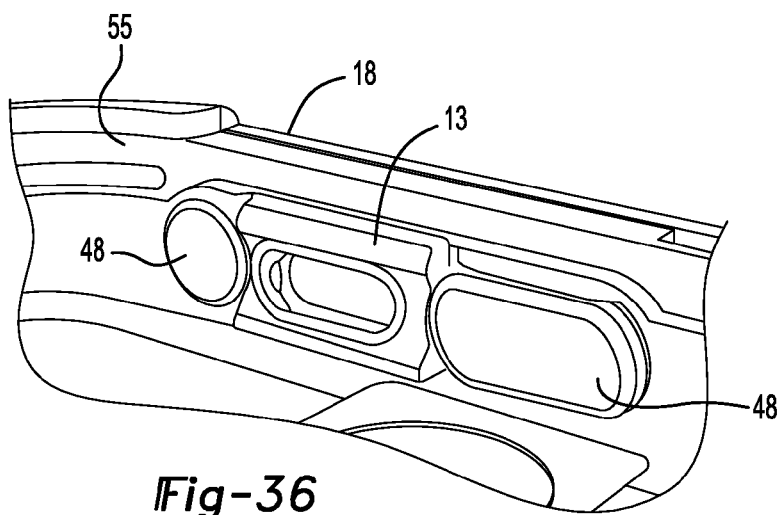
FIG. 36 is a partial perspective view of the plug and a membrane of the embodiment of FIG. 25.
Figure 37:
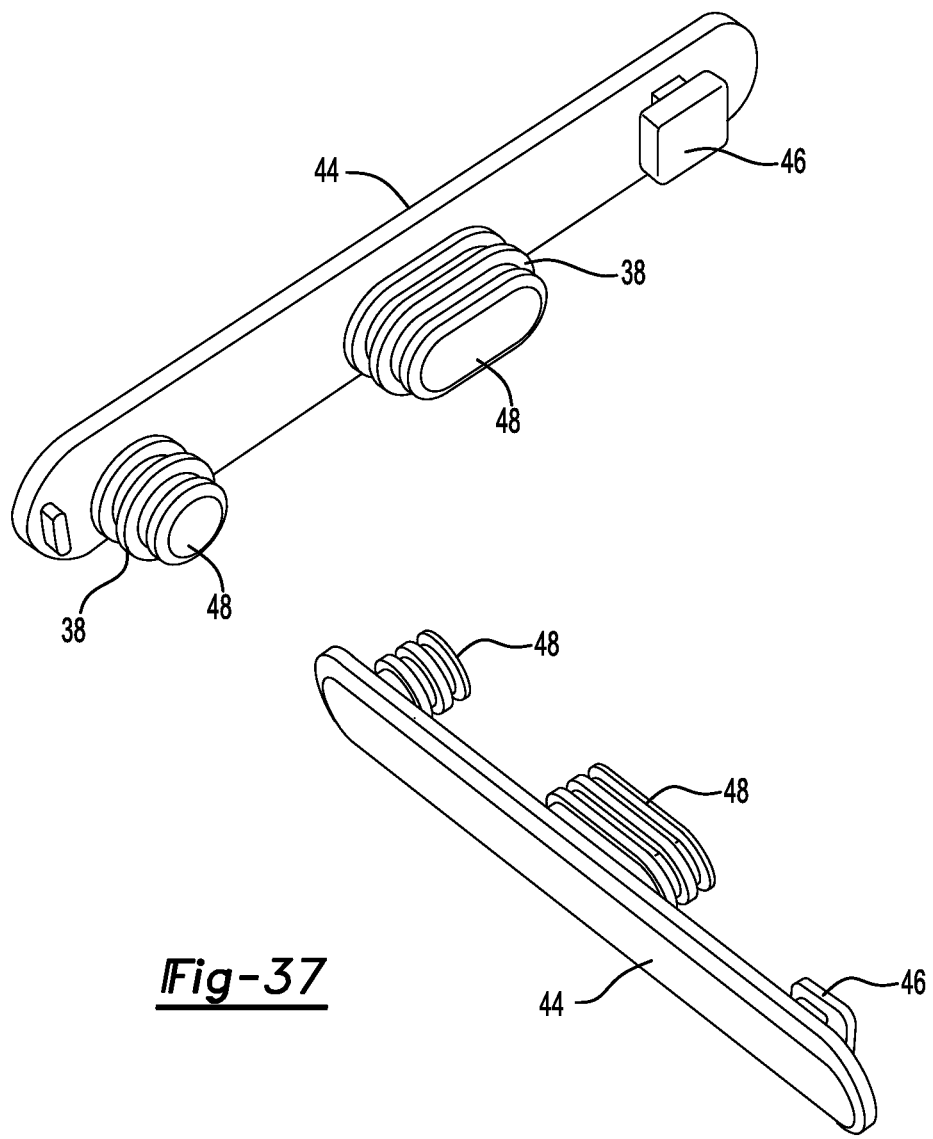
FIG. 37 is a perspective view of the plug of the embodiment of FIG. 25.

The case member 18 may include various slots and access ports 20 formed therein. The slots and access ports 20 may be used to actuate various functions using buttons or switches, to access or connect functional accessories, chargers or attachments to the enclosed device, or to allow sound transmission, as will be described in more detail below. Additionally, the case member 18 may include a window portion 22 formed therein that receives a screen member 24. Alternatively in another embodiment as shown in FIG. 24, the lid 16 may contain a window portion formed therein that receives a screen member.

As referenced above in FIGS. 1-8, the case member 18 includes a screen member 24 attached thereon about the window portion 22 of the case member 18. The screen member 24 may be a separate piece attached using various methods including using an adhesive, welding, molding or otherwise attaching the screen member 24. Alternatively, the screen member 24 may be formed with the case member 18 and may have a thickness that is different from other portions of the case member 18. In one aspect, the screen member 24 may be formed of a clear material allowing viewing of a display of the electronic device 12. The screen member 24 may have a thickness that allows a user to manipulate a touch screen of the electronic device 12 through the screen member 24. In one aspect, the screen member 24 may be formed of a PET or polycarbonate or a PC/PMMA blend, PBT material or other suitable material with high optical transparency and have a thickness of about 0.1 to 0.5 millimeters which will allow a user to manipulate a touch screen with or without another screen protector applied to the electronic device 12.

Figure 7:
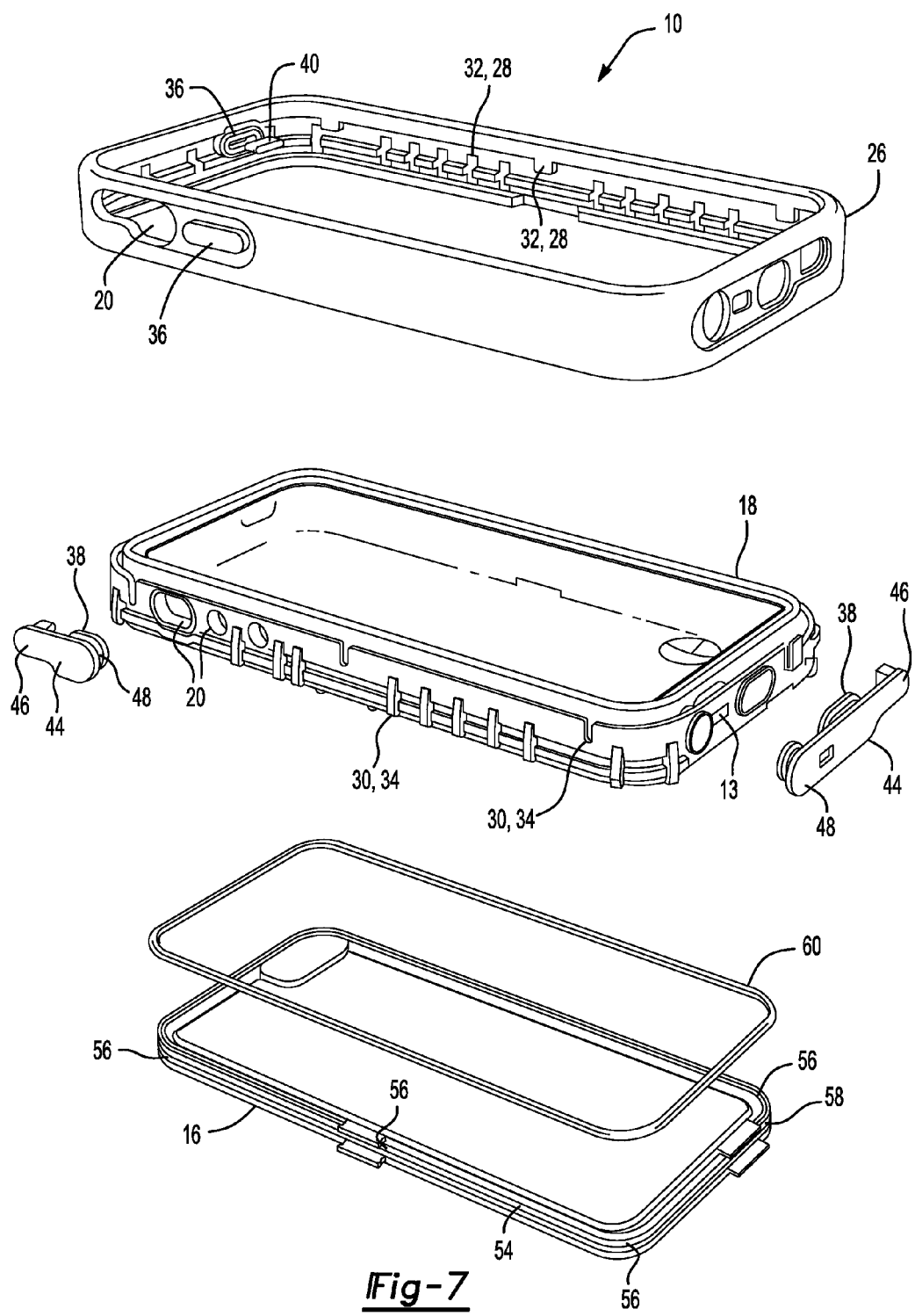
FIG. 7 is an exploded perspective view of a protective case including a mechanically attached bumper and separate buttons mechanically assembled to the case member for the embodiment of FIG. 1.
Figure 8A:
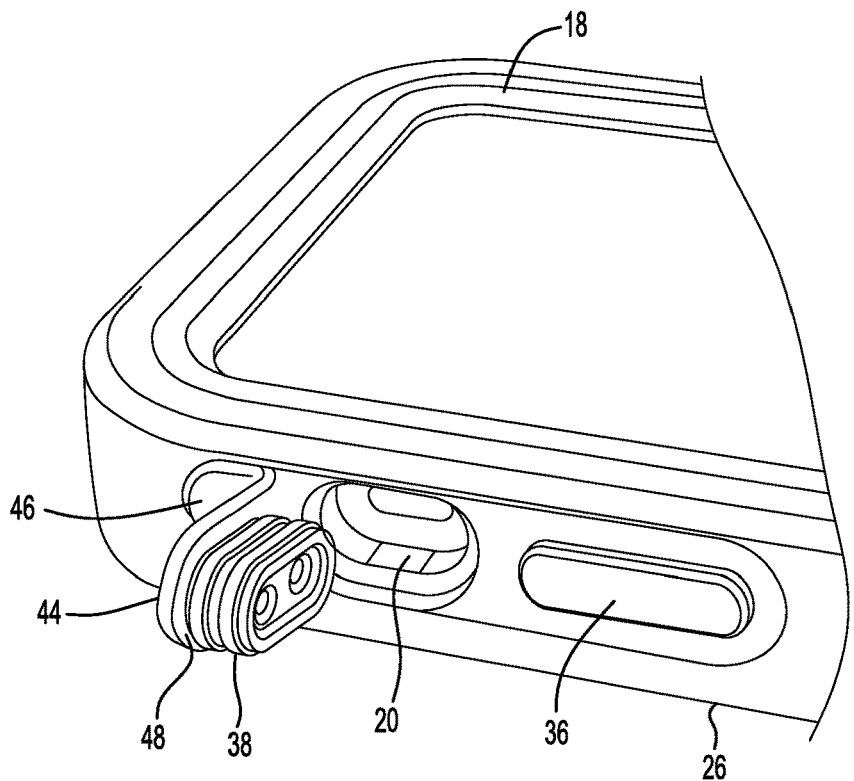
FIG. 8A is a partial perspective views of plugs assembled to the bumper and case member for the embodiment of FIG. 1.
Figure 8B:
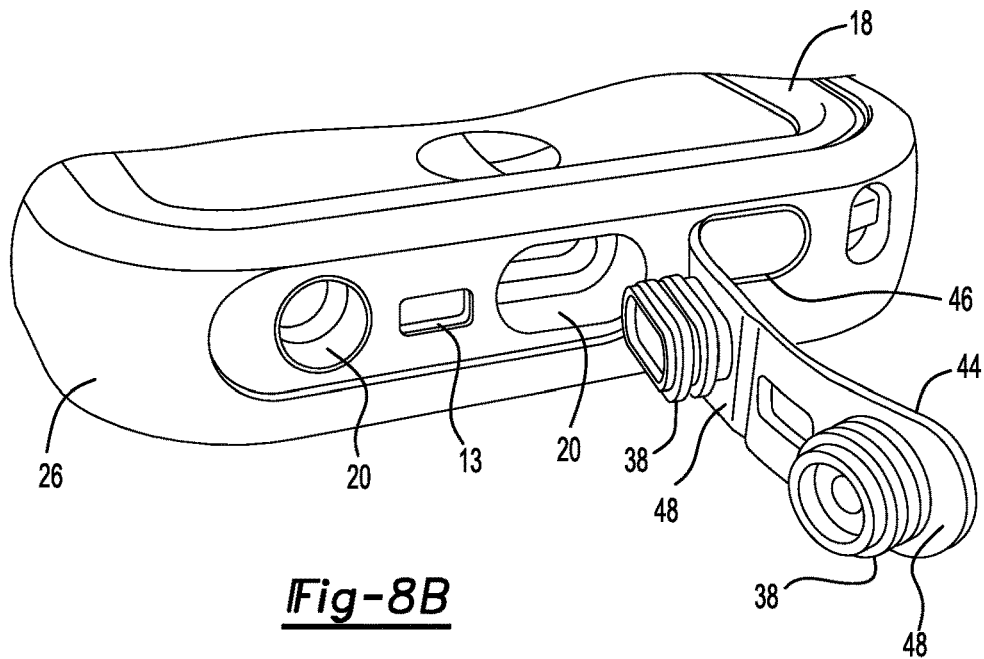
FIG. 8B is a partial perspective views of plugs assembled to the bumper and case member for the embodiment of FIG. 1.
Figure 8C:
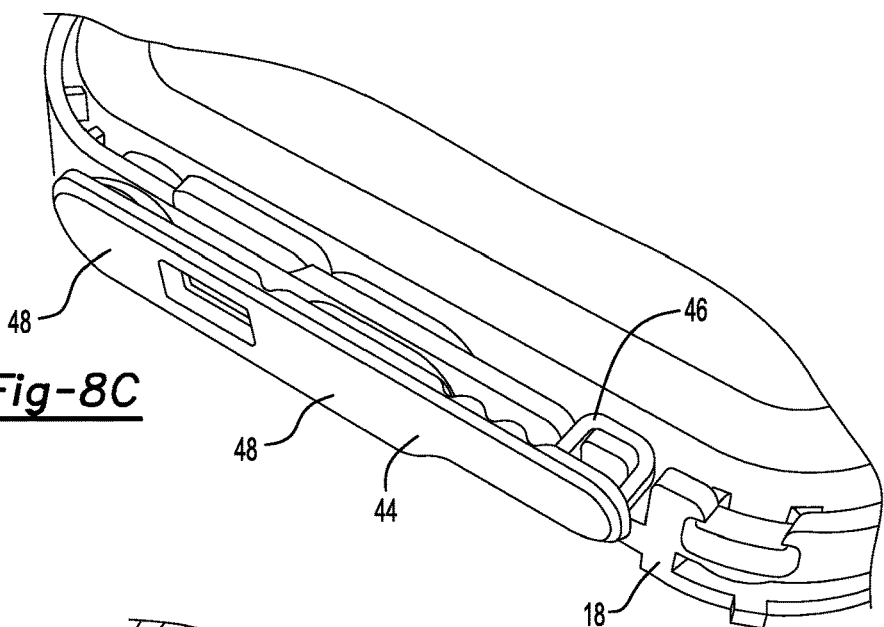
FIG. 8C is a partial perspective views of plugs assembled to the case member for the embodiment of FIG. 1.
Figure 8D:
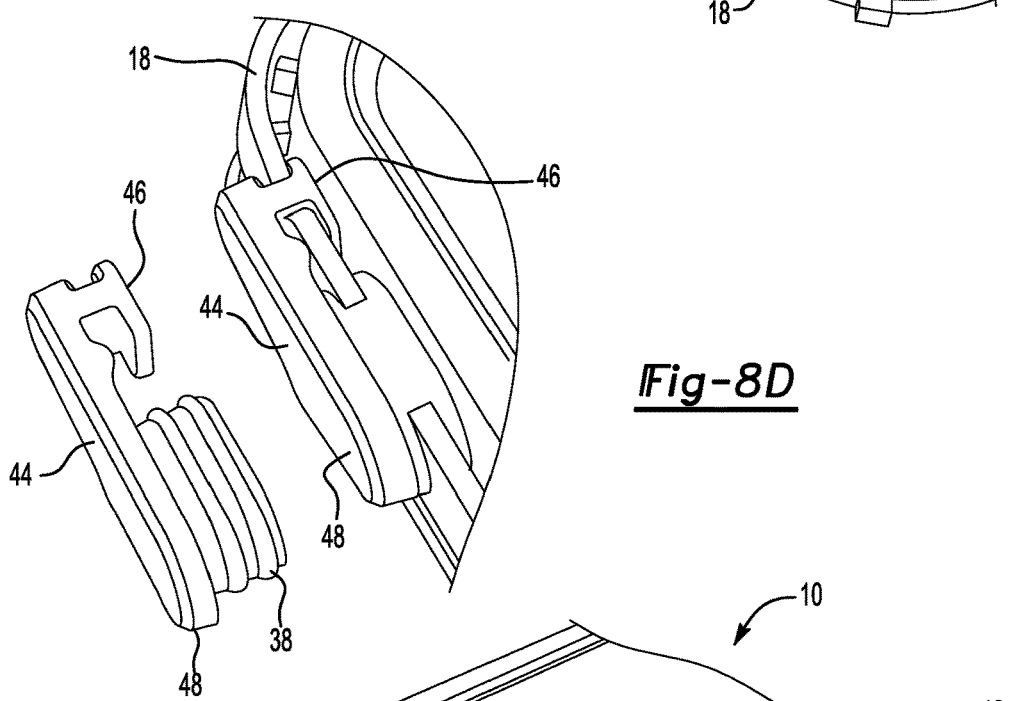
FIG. 8D is a partial perspective views of plugs assembled to the case member for the embodiment of FIG. 1.
Figure 9:
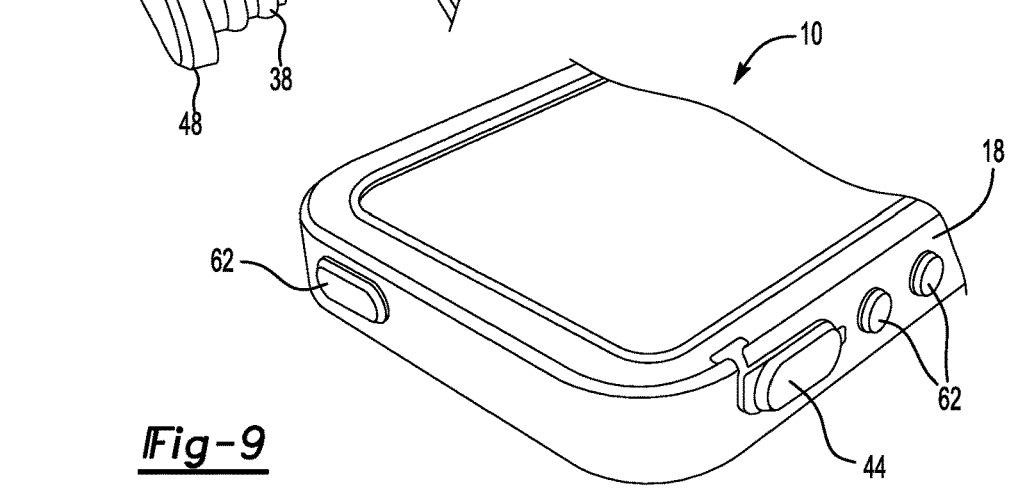
FIG. 9 is an assembled perspective view of another embodiment of a protective case.
Figure 10:
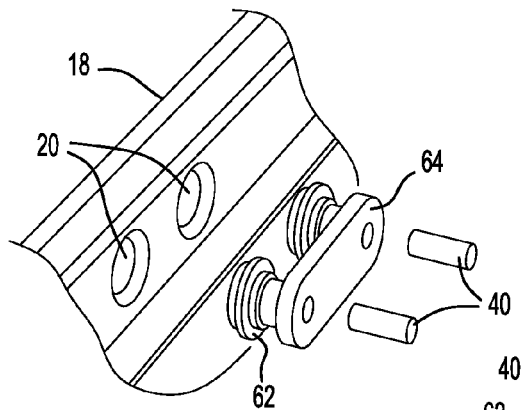
FIG. 10 is a partial perspective view a protective case including separate buttons mechanically assembled to the case member for the embodiment of FIG. 9.

The case member 18 may include a separate mechanically attached bumper 26. The separate bumper 26 may include attachment features 28 that are coupled to corresponding attachment features 30 formed on the case member 18, as best shown in FIG. 7. In one aspect, the attachment features 28 of the bumper 26 include notches 32 that receive corresponding tabs 34 on the case member 18. It should be realized that various shapes and sizes of notches and tabs 32, 34 on either of the bumper 26 or case member 18 may be utilized. The attachment features 28 on the case member 18 and the rubber bumper 26 mechanically interlock such that the bumper 26 is not easily removable from the case member 18. The bumper 26 may also include corresponding slots and access ports 20 that match those of the case member 18.

The separate bumper 26 may include button features 36 defined thereon that abut with portions of the case member 18, such as about the slots and access ports 20 to provide a sealing for the electronic device 12 as well as allow access to various toggles of the electronic device 12 as will be described in more detail below. In one aspect, the bumper 26 may be formed of rubber, an elastomer or other suitable material that is more flexible or has greater elasticity than the relatively more rigid material of the case member 18 such that when coupled the bumper 26 can undergo elastic deformation, which is reversible, and aligns with and accommodates the case member 18 and its corresponding tabs or notches 34, 32 and slots and access ports 20.

The button features 36 forms a waterproof seal through a plug type system. The plug type system utilizes a plug made of a flexible material such that when a force is applied to the material, it can undergo reversible elastic deformation and once that force is no longer applied, the plug returns to its original shape and which may or may not be formed as an integral part of the bumper 26.

As detailed above, the case member 18 has holes 20 located proximate to each of the button features 36. These holes 20 are sealed by sealing ribs 38 formed of a rubber, elastomer or other suitable flexible material that may be deformed by the more rigid material of holes 20 of the case member 18 and defined by the button features 36 of the bumper 26 that is mechanically attached. The distinction between this and another waterproof case is that the parts are mechanically assembled from two separate parts and not co-injected together like prior art waterproof cases. This reduces tooling cost, development cost and final cost per unit.

Figure 6:
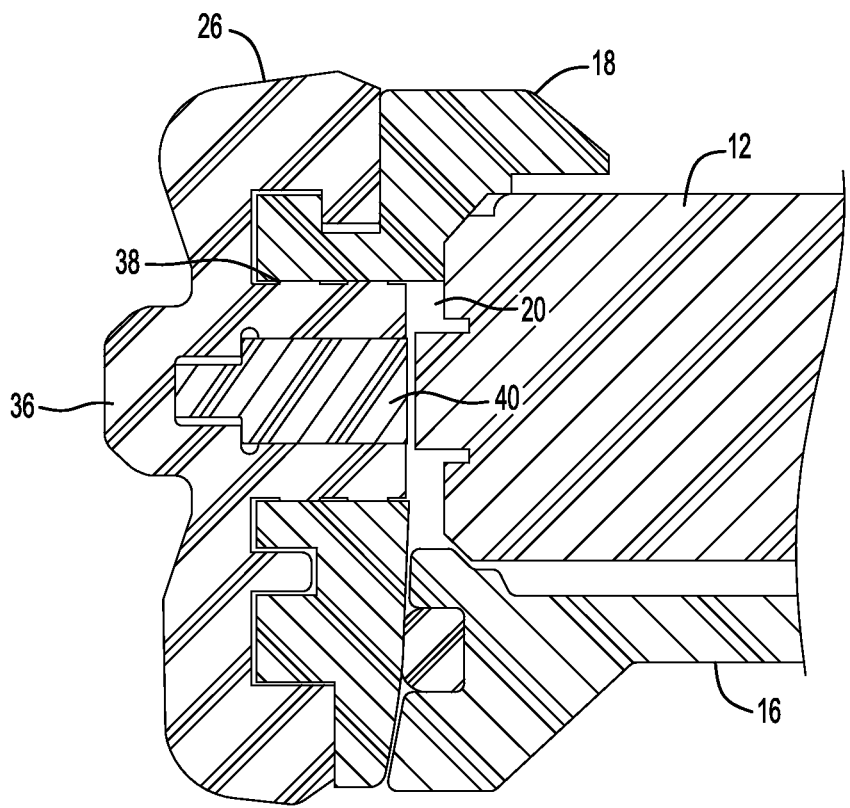
FIG. 6 is a partial sectional view a mechanically attached bumper and separate buttons mechanically assembled to the case member for the embodiment of FIG. 1.

Referring to FIGS. 3-6 there is shown a first embodiment of a case member 18 including button features 36 that are formed in the separate bumper 26. As can be seen in the figures, the button features 36 include an inner plug core 40 that may be formed of various relatively inelastic materials such as a hard plastic, metal or the like that serves several functions including: to stabilize the surrounding elastic material of the plug and to transmit the force applied to actuate the corresponding button of the enclosed device 12 such that less force is required to actuate the button of the device as less force is lost in elastic deformation and such that elastic material is subjected to less strain as less force is applied and the required deformation of the elastic material is lower thus increasing durability which is important for consistent waterproof function. The inner plug core 40 is surrounded by the elastic material that also forms sealing ribs 38 of a shape such that when force is applied to actuate the button, a portion of the force applied is directed in a radial direction on the rubber material of the sealing ribs 38 and exert greater compressive pressure and more contact with the relatively inflexible inner walls 42 of hole 20 thus ensuring that when actuated, the button increases the waterproof sealing force. The flexible plug material may be a separate part (see FIG. 12) or may be defined by the bumper 26. The sealing ribs 38 are sized such that they contact the inner walls 42 of the holes 20 of the case member 18 and seal the hole 20, as best seen in FIG. 6. The button features 36 pass through the case member 18 so that the user can actuate the device through the case. The plug core 40 stabilizes the button features 36 and ensures proper compression of the sealing ribs 38 for making a waterproof seal. The plug core 40 forms a direct connection like a piston, from the outside of the case to the device's toggles within the case.

Referring to FIGS. 7 and 8A-D, there is shown plugs 44 that allow access to other ports and features of the device within the case. These plugs 44 may be mechanically attached to the case member 18 by a variety of possible methods and could also be glued in place or could be formed as part of the bumper 26. The case member 18 may include additional structures that allow a user to operate the electronic device 12 with a watertight seal. The case member 18 may include a plug 44, best shown in FIG. 7 and FIGS. 8 C and D that is attached to the case member 18. The plug 44 includes an attachment structure 46 for mating with the case member 18 and a plug portion 48. In another embodiment, the plug 44 could be attached to the bumper 26. The plug portion 48 may include one or more sealing ribs 50 that compress to form a watertight seal.

As stated above, the protective case 10 includes a lid 16. The lid 16 may be formed of a clear material as specified above with respect to the case member 18 that allows for a visual inspection of an O-ring. The lid 16 includes a planar surface 52 that terminates at an edge 54. The edge 54 includes snap attachment structures 56 that mate with the main housing 14 at corresponding snap structures 55. The lid 16 also includes a groove 58 that receives a gasket 60. The gasket 60 may be an appropriately sized O-ring having a desired shore durometer those seats with the main housing 14 and lid 16 to provide a water tight seal.

Referring to FIGS. 9-12 there is shown another embodiment of a protective case 10 for an electronic device 12. As with the previous embodiment, the protective case 10 includes a main housing 14 and a lid 16. The main housing 14 may include a case member 18. The case member 18 may also include the slots or holes 20 formed therein as described above. In the depicted alternative embodiment, the button features 36 are not formed with a bumper 26 as previously described above. The depicted embodiment includes button features 36 that may be assembled from the inside of the case.

Figure 11:
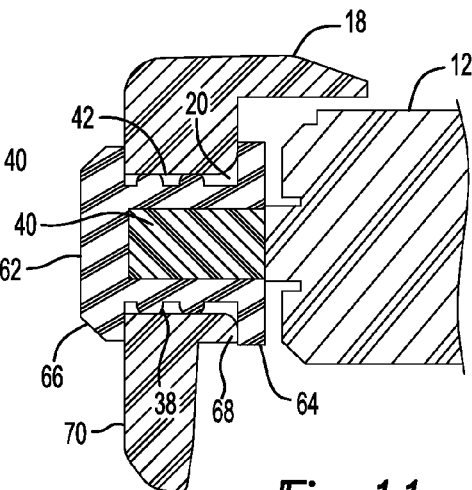
FIG. 11 is a partial sectional view of separate buttons for the embodiment of FIG. 9.
Figures 12A, 12B:
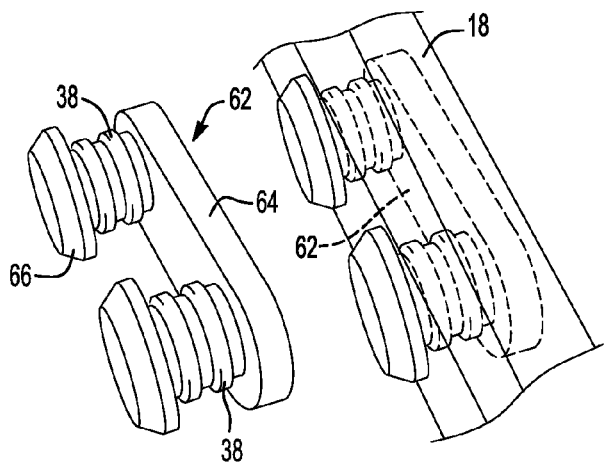
FIG. 12A is a perspective views of separate buttons for the embodiment of FIG. 9.
FIG. 12B is a perspective views of separate buttons for the embodiment of FIG. 9.

The depicted embodiment includes separate button members 62 that are mechanically assembled on the inside of the case member 18 to seal the case member 18 as well as provide actuation of the device's buttons within the closed case. As with the previously described embodiment, a plug core 40 may be formed of various relatively inelastic materials such as a hard plastic or the like that is surrounded by a rubber, an elastomer or other suitable material that is more flexible or has greater elasticity than the relatively more rigid material that also forms the one or more sealing ribs 38 defined by the rubber button members 62. The sealing ribs 38 are sized such that they contact the inner walls 42 of the holes 20 of the case member 18 and seal the hole 20, as best seen in FIGS. 11 and 12.

The button members 62 include flanges 64, 66 that mate with the inner and outer surfaces 68, 70 of the case member 18. When the plug core is not assembled within, the flange 66 may then undergo elastic deformation and is compressible to be inserted through the hole 20 in the case member 18 and then contact the outer surface 70 of the case member 18 and then return to its original shape. The flange 66 prevents the button from being easily removed and covers the hole 20 on both sides) Thus the button members 62 pass through the case member 18 so that the user can actuate the buttons of the device through the case without undergoing permanent deformation. The plug core 40 can then be inserted so that it stabilizes the button 62 and directs a portion of the force from actuation to a radial force to ensure proper compression of the sealing ribs 38 for making a waterproof seal while at the same time transmitting the actuating force to the enclosed device 12. The plug core 40 forms a direct connection like a piston, from the outside of the case to the device's button within. Overall, this reduces the amount of deformation of the relatively elastic material so that less force is required to actuate the button of the device 12, the elastic material does not undergo as much compressive strain reducing risk of compressive failure and improving durability, and disperses force radially on the sealing ribs 38 to increase the compressive sealing force so that as the force exerted, the waterproof seal is enhanced.

Figure 13:
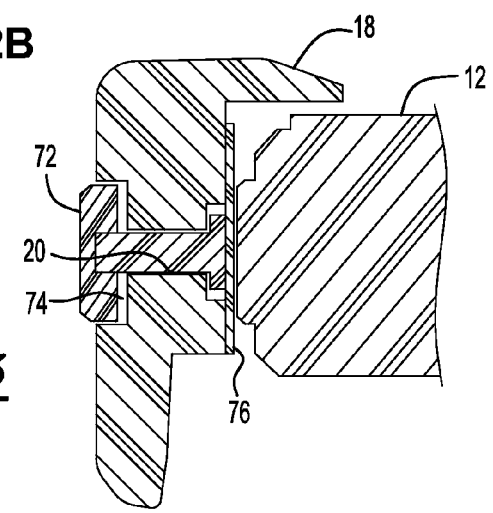
FIG. 13 is a partial sectional view of the separate buttons of a further embodiment of a protective case including separate buttons mechanically assembled to the case member.
Figure 14:
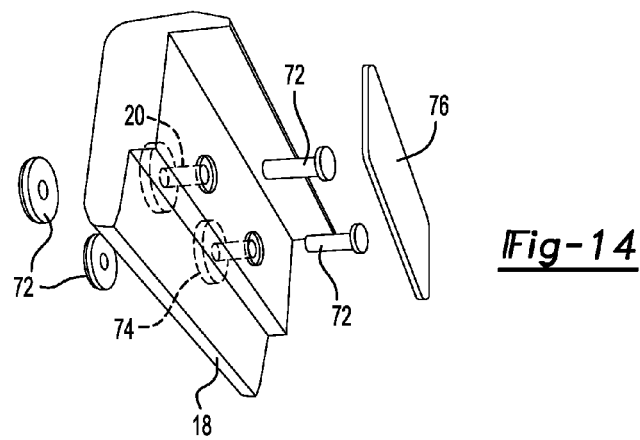
FIG. 14 is a partial exploded perspective view of a further embodiment of a protective case including separate buttons mechanically assembled and sealed to the case member for the embodiment of FIG. 13.

Referring to FIGS. 13 and 14 there is shown another embodiment of a protective case 10 for an electronic device 12. As with the previous embodiment, the protective case 10 includes a main housing 14 and a lid 16. The main housing 14 may include a case member 18. The case member 18 may also include the slots or holes 20 formed therein as described above. In the depicted alternative embodiment, the button features 36 include buttons 72 on a waterproof case without having to use a rubber over-mold. The button features 36 include a mechanical button made of a relatively inflexible material such as plastic 72 disposed within a cavity 74 on the case member 18 that may be joined through methods such as mechanical assembly using fasteners, press fits, snap fits, or spring loaded assembly; welding using spin welding, ultrasonic welding, vibration welding, solvent welding, cold or hot heading; or using adhesives or solvent cements. The button 72 is positioned in the case member 18 from an outside of the case member 18. The button 72 actuates the device like a piston. The button 72 is sealed and made waterproof by a thin membrane 76 that is made of a highly flexible material such as a rubber or elastomer that is resistant to abrasion, cuts, and tears and tear propagation to ensure its durability. This flexible material may be secured to the inside of the case member 18 in various ways such as with double sided adhesive tape or welding. The button 72 actuates the device by transmitting force directly until in engages the button of the underlying device 12 and displacing the flexible membrane 76 so that it undergoes elastic deformation but is still secured to the case member to toggle the device.

Figure 15A:
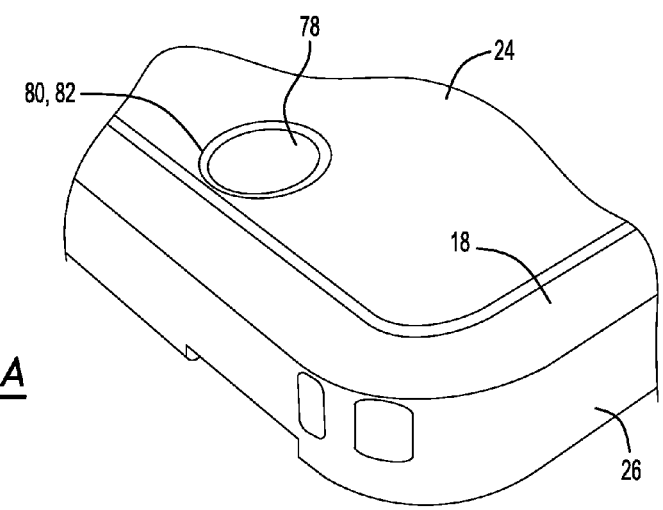
FIG. 15A is a partial perspective view of a home button formed in a touch screen with embossed or debossed features.
Figure 15B:
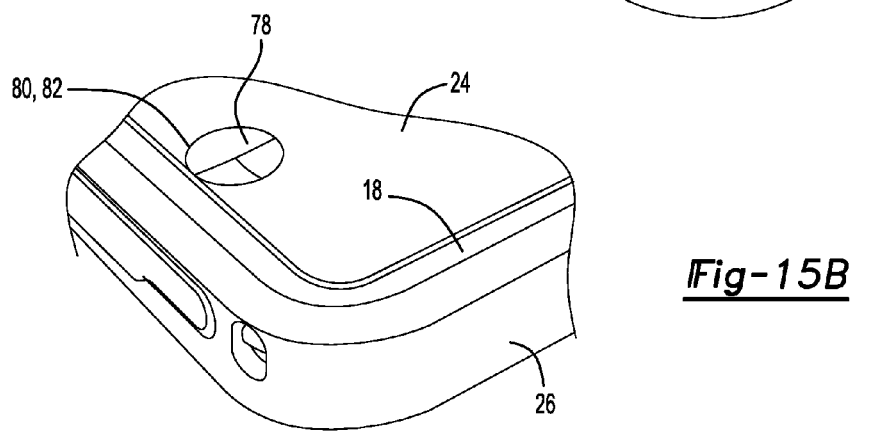
FIG. 15B is a partial perspective view of a home button formed in a touch screen with embossed or debossed features.
Figure 16A:
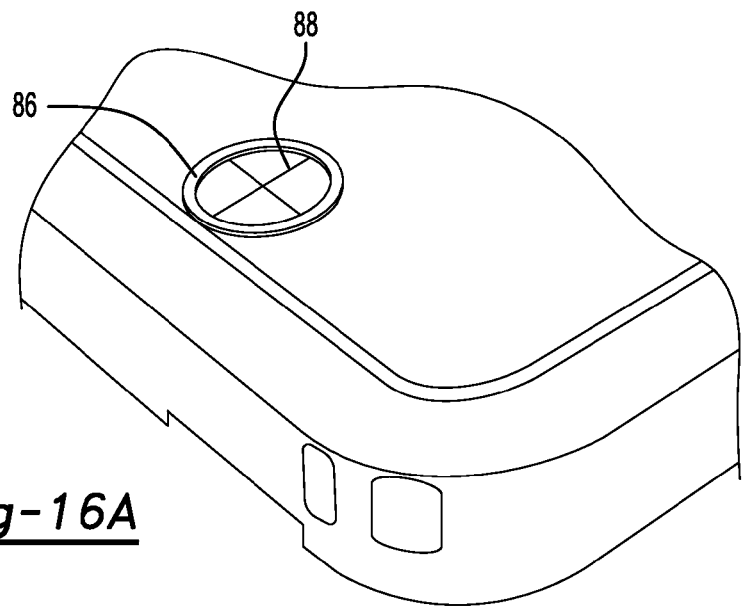
FIG. 16A is a perspective and exploded perspective views of a further embodiment of the home button formed as a separate part that is attached and sealed to the case thereon.
Figure 16B:
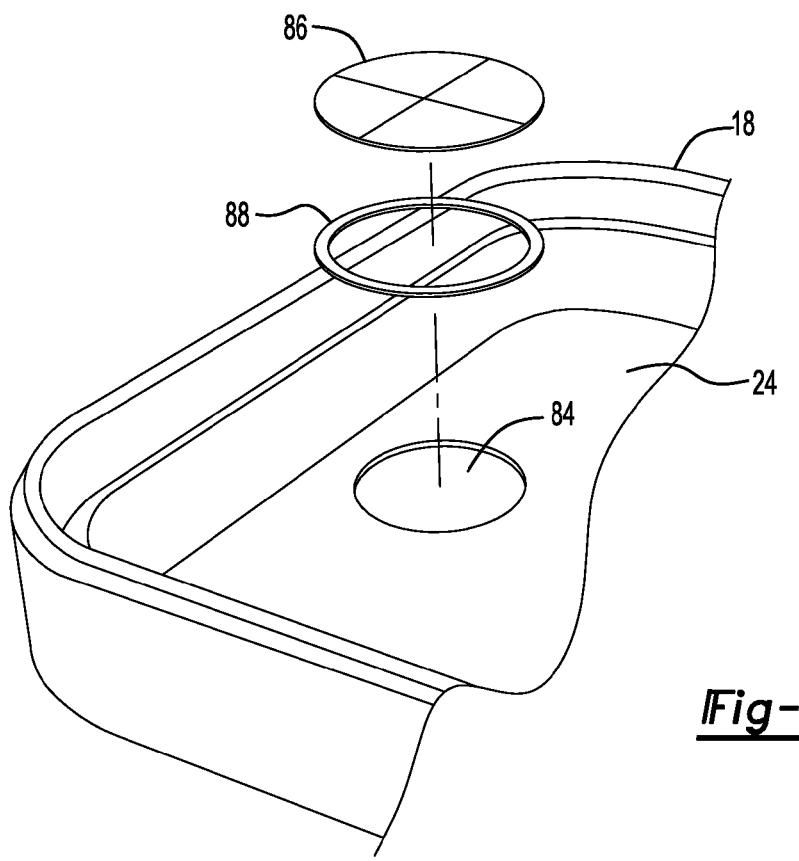
FIG. 16B is a perspective and exploded perspective views of a further embodiment of the home button formed as a separate part that is attached and sealed to the case thereon.
Figure 17:
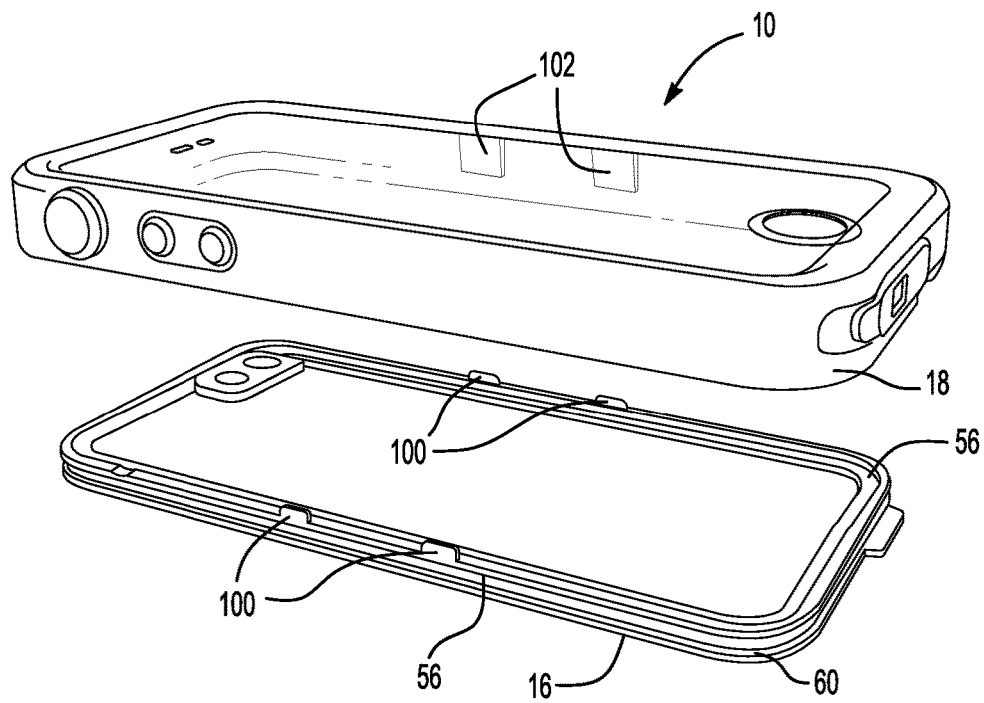
FIG. 17 is a perspective view of the protective case of FIG. 1 detailing attachment features for connecting the case member and lid.
Figure 18:
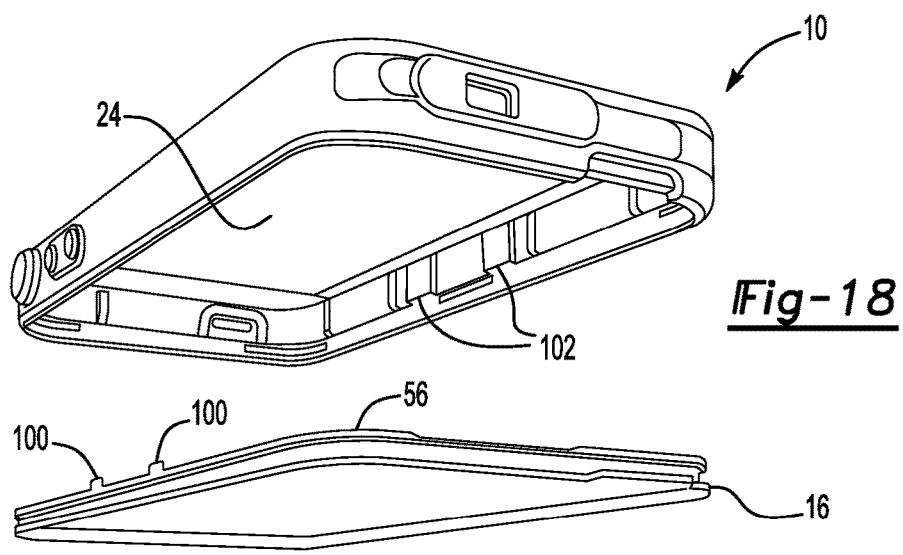
FIG. 18 is a perspective view of the protective case of FIG. 1 detailing attachment features for connecting the case member and lid.

Referring to FIGS. 15-16, there is shown the screen member 24 including a home button or toggle 78. As specified above, the case member 18 includes a screen member 24 attached thereon about the window portion 22 of the case member 18. The screen member 24 may be a separate piece attached using various methods including using an adhesive, welding, molding hot stamping, insert molding, co-injection or otherwise attaching the screen member 24. Alternatively, the screen member 24 may be formed with the case member 18 and may have a thickness that is different from other portions of the case member 18. In one aspect, the screen member 24 may be formed of a clear material allowing viewing of a display of the electronic device 12. The screen member 24 may have a thickness that allows a user to manipulate a touch screen of the electronic device 12 through the screen member 24 and allow for transmission of sound. The screen member may include embossed or debossed portions 80, 82 that form the shape of the button into the screen member 24. The embossed or debossed portions 80, 82 may include a thickness to allow a sensor such as a fingerprint sensor that may operate through optical imaging, ultrasonic sensors, or capacitance sensors such as a capacitive touch ID with RG signal to work through the screen member 24. For an optical sensor, the screen member may need to have a high transmittance and clarity so as not to prevent the capture of a clear optical image. For a capacitive sensor, the screen member may be formed of a dielectric material of suitable thinness and flexibility to allow the finger to be located closer to the capacitive sensor reducing attenuation in the RF signal. A capacitive sensor may operate by relying upon applying a small RF signal that is coupled into the live layer of the skin by a conductive surface positioned around the outside of the active imaging area of the sensor and then using sensors in the array to measure the RF field that emulates the shape of the conductive skin layer with sensors near ridges measuring higher signals while sensors near valleys measuring lower signals. Since such a sensor operates as each capacitive sensing element may be capacitively coupled to a portion of finger overlying that capacitive sensing element, the distance between the overlying finger portion and capacitive sensing element determines the capacitance between the two and thus the signal registered at the capacitive sensing element. As such, as the distance decreases, the signal increases. Each capacitive sensing element is also capacitively coupled to other adjacent overlying finger portions, and as the distance increases, this leads to a blurring effect, which reduces the total signal difference between capacitive sensing elements directly under finger ridges and finger valleys. Thus, a screen member may be suitably thin and may need to be flexible to be displaced and allow the finger portion to be more proximal to the sensor and the material may be dielectric to avoid affecting capacitance.

Alternatively, as shown in FIG. 16, the screen member 24 may include a cut out or hole 84 that is covered with a thin flexible film 86. In one aspect, a thin rubber or plastic film or membrane 86 that is formed of a more flexible material and thinner than the screen member 24. The thin flexible membrane 86 allows a sensor capacitive touch ID to work through the screen member 24. The thin flexible membrane 86 may be assembled to the screen member 24 with double sided adhesive tape 88, welding or other means of a secure attachment to form a hermetic seal. In another aspect, an optically clear material with high transparency may be employed to enable an optical sensor to function and may be similarly mounted.

Referring to FIGS. 17-21 there is shown the stabilization features for connecting the case member 18 and lid 16. In one aspect, the lid 16 includes male stabilization features 100 that are received in female stabilization features 102 formed in the case member 18. The male and female stabilization features 100, 102 may be utilized along the longer length of the case member 18 or may be positioned anywhere around the case member 18. On the longer sides, the case member 18 will flex to a greater extent than the shorter sides due to the force of the gasket or O-ring 60 that is applied when the lid 16 and case member 18 are joined. The compression such as a radial compression, although an axial compression may be used applied by the gasket 60 is countered by the male and female stabilization features 100, 102 as shown by the directional arrows of FIG. 19 to ensure that a consistent compression is applied by the gasket 60 about the entire case 10. In the depicted embodiment, the female stabilization 102 feature includes a slot 103 formed in the case member. The male stabilization feature 100 includes a projection 105 that is sized to fit within the slot 103. The groove 58 formed in the lid 16 may be formed in the lid 16 below the male stabilization feature 100 such that the gasket 60 is compressed between the groove 58 and the inner wall 107 of the case member 18 that defines the slot 103.

Referring to FIGS. 22-23 there is shown an alternate embodiment of the male and female stabilization features 100, 102. In the depicted alternative embodiment, the male stabilization feature 100 of the lid 16 includes an interlocking feature 110 that mates with a corresponding shaped feature 112 formed on the case member 18. In the depicted embodiment, the female stabilization features 102 with two shown, are defined by the wall 109 of the case member 18 and extends from a straight portion of the wall 111 at a bend 113 which may be a radius or may be a straight bend. The bend 113 is sized such that wall 115 extends at an acute angle relative to the straight wall section 111.

In the depicted embodiment, the male stabilization feature 100 is formed on the lid 16. The male stabilization feature 100 includes a projection 117 that extends from the lid 16 and includes a keyed shape 119 that mates with the female stabilization feature 102. The keyed shape 119 includes a body portion 121 that has opposing bends 123 such as radiuses formed thereon. The bends 123 are shaped to nest on the bends 113 of the female stabilization feature 102. The keyed shape 119 includes walls 125 that extend from the opposing radiuses 123 and abut the acute angled wall 115 of the female stabilization feature 102. As described above, the interlocking features 110, 112 may be utilized along the longer length of the case member 18 which will flex to a greater extent than the shorter sides due to the force of the gasket or O-ring 60 that is applied when the lid 16 and case member 18 are joined. The compression applied by the gasket 60 is countered by interlocking features 110, 112 to ensure that a consistent compression is applied by the gasket 60 about the entire case 10.

Referring to FIG. 24, there is shown an alternative embodiment of a case 10 where the lid 16 includes the screen member 24. In one aspect, this embodiment may include a gasket 60 that is seated in a side grove of the lid to apply a radial compression when joined with the case member 18. The screen 24 may be attached to the lid 16 utilizing various methods including glue, tape or other adhesives. The male and female attachment features 100, 102 as described above may be included on the lid 16 and case member 18. As described above, the attachment features 100, 102 may be utilized along the longer length of the case member 18 which will flex to a greater extent than the shorter sides due to the force of the gasket or O-ring 60 that is applied when the lid 16 and case member 18 are joined. The compression applied by the gasket 60 is countered by attachment features 100, 102 to ensure that a consistent compression is applied by the gasket 60 about the entire case 10.

In one aspect, the stabilization features 100, 102 or interlocking features 110, 112 may be utilized for the ipad mini and other devices that could be categorized as a tablet or large smartphone with a screen above 4.5 inches. Basically, these larger devices will have longer wall sections along the sides of the case. This longer wall section will inevitably be not straight as no plastic part can ever be perfect. The wall sections can deform because of the material not being rigid enough, warping post injection as the part cools down, or warping and bending when assembled. In one aspect, to improve this deformation of the part one may increase the structure in the part design to make it more rigid, put the part into a jig to hold its position after cooling, and design mechanical attachment systems that counteract the warping when assembled, such as the stabilization features 100, 102. In another aspect, as a rigid electronic device is positioned within the housing one can also use the electronic device as a structural part of the case when assembled. The device will sit within the housing and the design of the housing will fit the electronic device perfectly so the device rigidly supports the whole structure of the case on all 6 sides of the case stabilizing the structure. The case may preferably touch and couple with all sides of the housing very securely. In one aspect, some of the materials on the surface of these electronic devices can be damaged by a case being attached, especially polycarbonate and aluminum housing parts which can scratch easily. To obviate such potential problems one may pad the case with a material that is suitably forgiving as to not scratch the device within. On may use foam, rubber or other soft material to touch the device within. These foams or rubbers can be mechanically assembled, glued, taped or co-molded onto the housing. In the case of the co-molded part, we can also use this to give a rubber grip to the outside of the part and provide impact protection.

Referring to FIGS. 25-37, there is shown an alternative embodiment of a case 10 that includes similar stabilization features and snap structures as presented above with the holes and toggles in differing positions on the case member. The components as described above are similarly numbered in the alternative embodiment.

In use, a user may position an electronic device 12, such as a phone and in particular a phone having a touch screen within the case member 18. The lid 16 may then be joined with the main housing 14 such that the O-ring or gasket 60 is seated in the groove 58 of the lid 16 and a compression is applied to the O-ring 60 sealing the lid 16 and main housing 14 and provides a water and air tight seal. The user may operate the various functions of the electronic device 12 through the use of the button features 36 as described above. A touch screen of the electronic device 12 may be operated through the screen member 24 of the case member 18.

We claim:

1. A protective case for an electronic device comprising:
 a case member including slots and ports formed therein for allowing interaction with a device positioned within the case member, the case member including inner and outer surfaces;
 separate button features assembled to the case member sealing the case member and providing actuation of the device;
 the case member and a lid removably joined to define an air and water tight volume receiving the device;
 wherein the button features include a pair of flanges separated by sealing ribs and the button features assembled from inside the case member wherein one of the flanges of the pair of flanges seals to the outer surface of the case member and the other of the pair of flanges seals to the inner surface of the case member and wherein the sealing ribs seal to an inner wall of the slot.

2. The protective case of claim 1 wherein the button features include a plug core surrounded by elastic material forming the sealing ribs.

3. The protective case of claim 2 wherein the plug core stabilizes the sealing ribs and directs a portion of an actuation force to a radial force wherein the sealing ribs compress against the hole.

* * * * *